(12) United States Patent
Mahajan et al.

(10) Patent No.: US 8,671,027 B2
(45) Date of Patent: Mar. 11, 2014

(54) PRODUCT SEARCHING IN A RETAIL ENVIRONMENT

(75) Inventors: Rohit Mahajan, Bangalore (IN); Sameer Ali Khan, Bangalore (IN)

(73) Assignee: SAP AG, Walldorf (DE)

( * ) Notice: Subject to any disclaimer, the term of this patent is extended or adjusted under 35 U.S.C. 154(b) by 31 days.

(21) Appl. No.: 13/477,050

(22) Filed: May 22, 2012

(65) Prior Publication Data

US 2013/0317946 A1 Nov. 28, 2013

(51) Int. Cl.
*G06Q 30/00* (2012.01)

(52) U.S. Cl.
USPC ........................................... 705/26.1

(58) Field of Classification Search
USPC ............................................ 705/26.1
See application file for complete search history.

(56) References Cited

U.S. PATENT DOCUMENTS

2012/0117048 A1* 5/2012 Rosenoff et al. .............. 707/706

* cited by examiner

*Primary Examiner* — Mila Airapetian

(57) ABSTRACT

In one embodiment, one or more search criteria are received from a mobile device. In response, one or more products corresponding to the search criteria are extracted. Further, a plurality of factors associated with the one or more products are retrieved and weightages are assigned to the plurality of factors. Furthermore, product scores of the one or more products are determined based on the plurality of factors and the weightages. Based on the product scores, the one or more products are presented to assist product searching in retail environment.

20 Claims, 4 Drawing Sheets

US 8,671,027 B2

PRODUCT SEARCHING IN A RETAIL ENVIRONMENT

FIELD

Embodiments generally relate to product searching and more particularly to methods and systems to assist product searching in a retail environment.

BACKGROUND

Retail stores include numerous products from different manufactures and similar products may have different prices. Searching for a desired product in retail stores is a common, but key activity of a customer. Further, searching and selecting a right product may be a hectic and time consuming activity, especially in large supermarket stores. Currently, to enhance shopping experience, methods such as providing an electronic list of products on a kiosk and providing a bar code scanner to view the price of products are used. However, such methods may not optimize the time spent by the customer in searching for the desired product. It is important for retail stores to provide customer satisfaction and offer better services that help customers find a desired product.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to assist product searching in a retail environment are described herein. According to various embodiments, the retail environment may be an environment in which different products from different manufacturers are offered for sale. The products may be related to one or more product types. For example, the product type may be products associated with but are not limited to consumer electronics (e.g., laptops, televisions, music players and refrigerators), books and magazines (e.g., audio books, biography, autobiography and fiction), software applications (e.g., operating systems, picture editing applications and home or business use applications), toys and games.

According to one embodiment, search criteria are received to search for a desired product. In response, products corresponding to the search criteria are retrieved. Further, product scores of the retrieved products are determined and based on the product scores, the products are presented to a customer. Further, the application of searching products in the retail environment may be performed on a mobile device of the customer. Thereby, with few steps the customer will be aware of details of the products. Therefore, the process of searching products in the retail environment may become easier.

In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
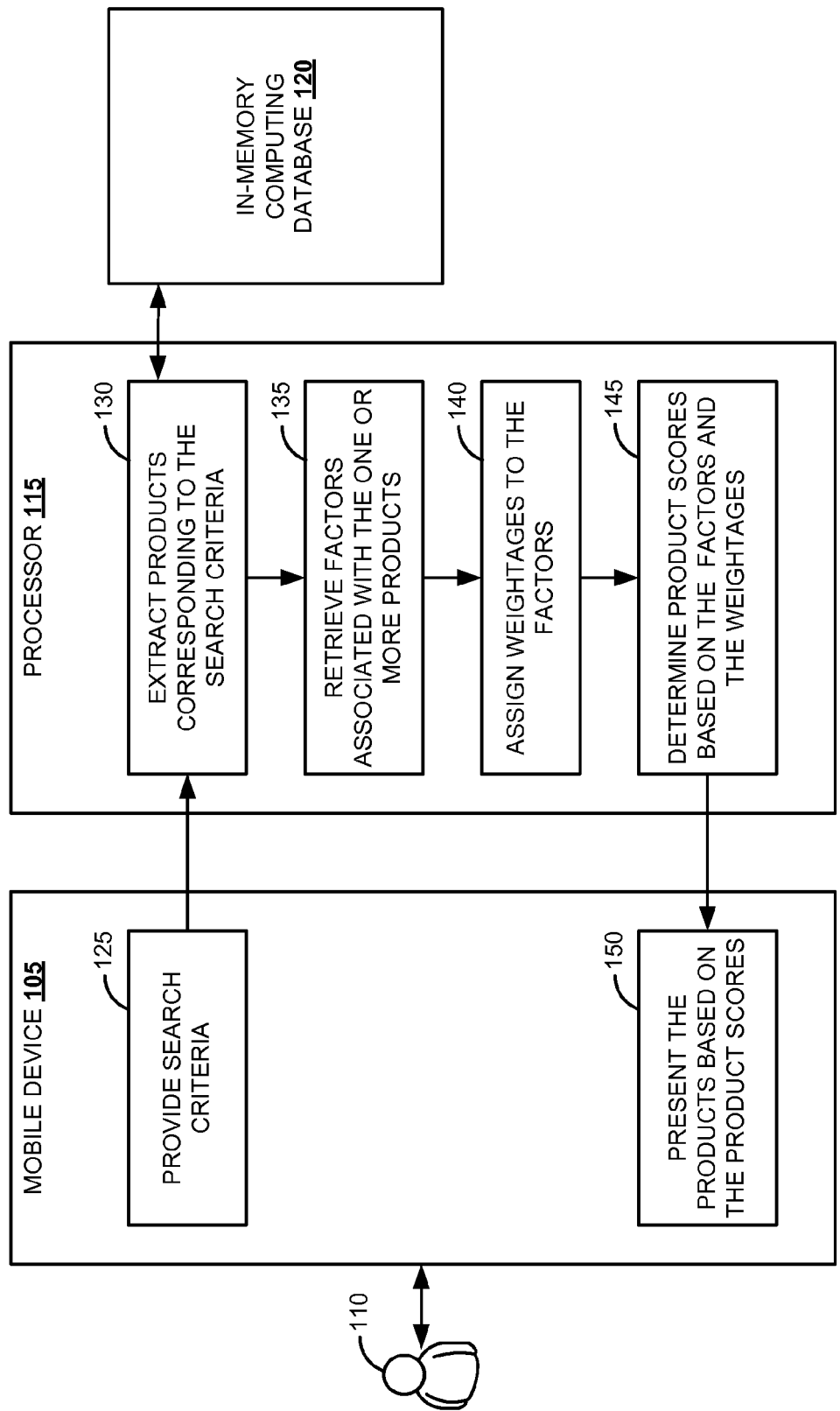
FIG. 1 is a functional block diagram illustrating product searching in a retail environment, according to an embodiment.

FIG. 1 is a functional block diagram illustrating product searching in a retail environment such as a retail store, according to an embodiment. The process of product searching may be initiated by a customer using a mobile device, when the customer is in the retail store. The mobile device 105 also known as a handheld device or handheld computer system is a computing device including a graphical user interface (e.g., display). The graphical user interface is generally a means for providing an interface for a customer 110 to interact with a processor 115 with touch input and/or miniature keyboard. The behavior of the graphical user interface may be governed by computer executable instructions that are executed when the customer 110 interacts with the graphical user interface of the mobile device 105.

In one embodiment, the graphical user interface of the mobile device 105 provides an option for the customer 110 to provide search criteria (e.g., 125) associated with a product. For example, the search criteria may include but is not limited to the product type (e.g., laptop, a television, a music player, a refrigerator, audio books, biography, autobiography, fiction, monthly magazines, weekly magazines and the like), product price range, brand names, color and size. The step 125 is described with an example in FIG. 2.

Further, the processor 115 assists the customer in product searching in the retail environment. In one exemplary embodiment, the processor 115 may reside in the mobile device 105. In another exemplary embodiment, the processor 115 may reside in other remote computer system. The computer system is described in greater detail in FIG. 4. At step 130, the products corresponding to the search criteria are extracted from an in-memory computing database 120 (e.g., HANA of SAP™). In one exemplary embodiment, the in-memory computing database 120 may include a list of products and factors associated with the products facilitating real-time analytics. Further, the in-memory computing database 120 is at a physical location, i.e. at the retail store.

At step 135, factors associated with the products are retrieved and weightages to the factors are assigned (e.g., step 140). For example, factors may include but are not limited to price discounts, ratings and energy stars associated with the products. Based on the factors, weightages may be assigned. Furthermore at step 145, the product scores for the extracted products are determined. For example, the product scores are determined using the factors and the weightages associated with the products. At step 150, the products are presented on the graphical user interface of the mobile device 105 based on the product scores. The steps 130 to 150 are described with an example in FIG. 2.

Figure 2:
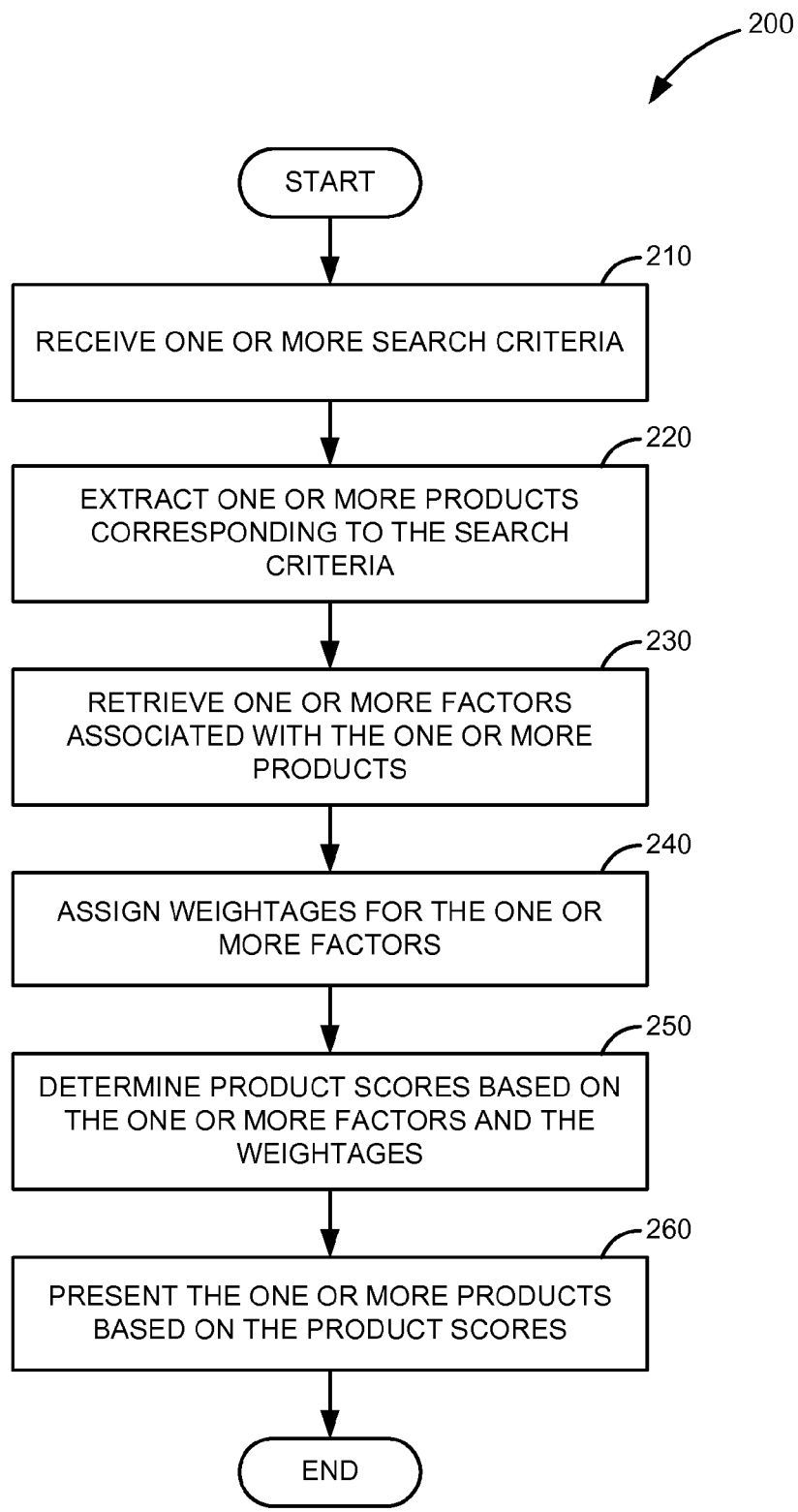
FIG. 2 is a flow diagram illustrating a method to assist product searching in a retail environment, according to an embodiment.

FIG. 2 is a flow diagram illustrating a method to assist product searching in a retail environment, according to an embodiment. At step 210, one or more search criteria are received from a mobile device. The search criteria may include but is not limited to a product type (e.g., 'laptop'), a product price range (e.g., 1000 USD to 3000 USD) and desired brand (e.g., Lenovo™, DELL™ and HP™). For example, a customer is interested in laptops with a price range of 1000 USD to 3000 USD of specified manufacturers. In one exemplary embodiment, the customer may initiate a search by selecting a search option or by providing a change in motion of the mobile device (e.g., by shaking the mobile device).

At step 220, the one or more products corresponding to the search criteria are extracted. For example, products such as PRODUCT A (1500 USD), PRODUCT B (2000 USD), PRODUCT C (2500 USD) and PRODUCT D (3000 USD) corresponding to the search criteria mentioned in step 210 are extracted. In one exemplary embodiment, the products are extracted from an in-memory computing database, which provides real time analysis. At step 230, a plurality of factors associated with the products is retrieved. The factors may include but are not limited to a price discount, ratings and energy stars associated with the products. In one exemplary embodiment, the factors associated with the products are specified by a concerned authority of a retail shop and are stored in the in-memory computing database. The examples of the factors are depicted in Table 1.

TABLE 1

|  | Price Discount | Ratings | Energy Stars |
|---|---|---|---|
| PRODUCT A | 20% | 3 | 4 |
| PRODUCT B | 25% | 4 | 3 |
| PRODUCT C | 15% | 5 | 4 |
| PRODUCT D | 30% | 4 | 3 |

In one exemplary embodiment, the ratings corresponding to the products may be retrieved from reviews associated with the products using a natural language processing (NLP) technique. Higher the ratings, higher the quality of the product and vice versa. Further, the energy stars define energy efficiency which helps to protect the environment through energy-efficient products. Higher the energy stars, the product is considered environment friendly and vice versa.

At step 240, weightages for the one or more factors are assigned. In one embodiment, the weightages are intelligently assigned based on the factors as depicted in Table 2. For example, for 0-10% price discount, a weightage of '1' may be assigned. For 11-20% price discount, a weightage of '2' may be assigned. Further, for 21-30% price discount, a weightage of '3' may be assigned and for 31-40% price discount, a weightage of '4' may be assigned and so on.

TABLE 2

|  | Price Discount | Weightage for Price Discount | Ratings | Weightage for Ratings | Energy Stars | Weightage for Energy Stars |
|---|---|---|---|---|---|---|
| PRODUCT A | 20% | 2 | 3 | 2 | 4 | 3 |
| PRODUCT B | 25% | 3 | 4 | 3 | 3 | 2 |
| PRODUCT C | 15% | 2 | 5 | 3 | 4 | 3 |
| PRODUCT D | 35% | 4 | 4 | 3 | 3 | 2 |

At step 250, the product scores of the one or more products are determined based on the plurality of factors and the weightages. In exemplary embodiment, the product scores are determined using a mathematical function as in equation (1).

$$\text{Product score} = (\text{Factor 1} \times \text{corresponding weightage of Factor 1}) + (\text{Factor 2} \times \text{corresponding weightage of Factor 2}) + \ldots + (\text{Factor } N \times \text{corresponding weightage of Factor 3}) \quad (1)$$

For example, the product scores of the products depicted in Table 2 are determined as shown in equation (2A), (2B), (2C) and (2D).

$$\text{Product score of PRODUCT } A = (20 \times 2) + (3 \times 2) + (4 \times 3) = 58 \quad (2A)$$

$$\text{Product score of PRODUCT } B = (25 \times 3) + (4 \times 3) + (3 \times 2) = 93 \quad (2B)$$

$$\text{Product score of PRODUCT } C = (15 \times 2) + (5 \times 3) + (4 \times 3) = 57 \quad (2C)$$

$$\text{Product score of PRODUCT } D = (35 \times 4) + (4 \times 3) + (3 \times 2) = 158 \quad (2D)$$

Although equation (1) is one way of determining the score, other mathematical techniques can be used to determine product scores using the product type and the factors associated with the products. At step 260, the one or more products are presented by arranging the products based on the product scores. In one exemplary embodiment, the products are arranged on a display of the mobile device using techniques such as but not limited to a dust and magnet information visualization technique. Presentation of the products based on the product scores is described in greater detail in FIG. 3.

Figure 3:
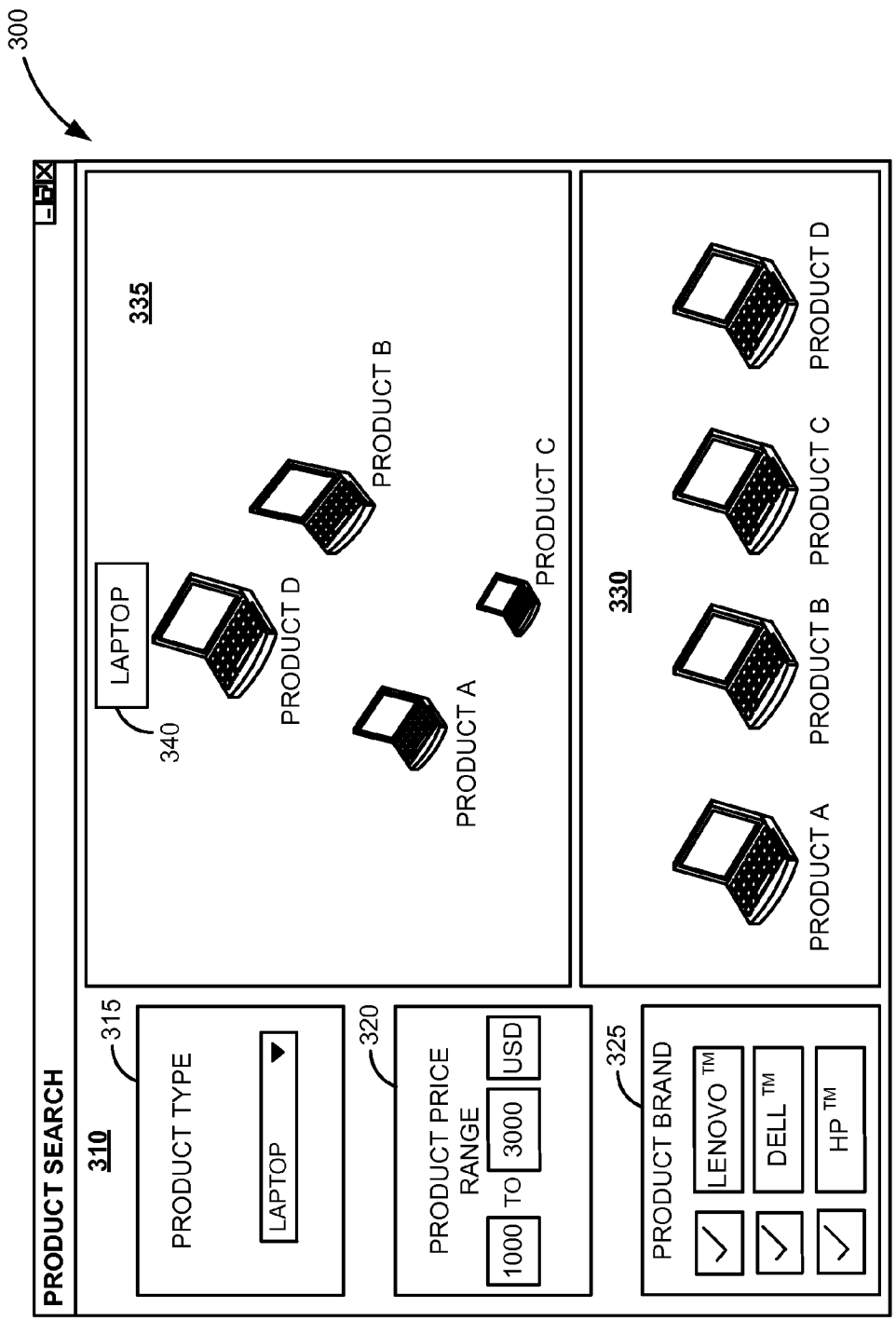
FIG. 3 is an exemplary user interface illustrating display of products based on determination of product scores, according to an embodiment.

FIG. 3 is an exemplary user interface 300 illustrating presenting products based on determination of product scores, according to an embodiment. The graphical user interface 300 is an exemplary user interface presenting an output or result of a method of FIG. 2 for product search. The graphical user interface 300 includes a first portion 310 for receiving one or more search criteria. For example, the search criteria may be but not limited to a product type 315 (e.g., product type 'laptop'), a product price range 320 (e.g., 1000 USD to 3000 USD) and a product brand 325 (e.g., Lenovo™, DELL™ and HP™)

Further, the graphical user interface 300 includes a second portion 330 for displaying the extracted products of step 220 of FIG. 2. For example, the products (e.g., PRODUCT A, PRODUCT B, PRODUCT C and PRODUCT D) corresponding to product type 'laptop', within the price range 1000 USD to 3000 USD and of various brands are extracted and displayed in the second portion 330.

Furthermore, the graphical user interface 300 includes a third portion 335 for displaying the products based on product scores as in step 260 of FIG. 2. For example, considering the product scores of equations (2A) to (2D), the products are displayed in the third portion 335 using visualization techniques such as but not limited to a dust and magnet information visualization technique. The dust and magnet visualization technique uses a magnet metaphor in which the products are represented as particles of iron dust, and magnet (e.g., laptop 340) represents the product type. The product score of PRODUCT D (e.g., 158) is higher when compared to other products (e.g., PRODUCT A, PRODUCT B and PRODUCT C). Therefore, PRODUCT D is enhanced (e.g., enhanced with greater size, different color and the like) and placed closer to the laptop 340. Further, since the product score of PRODUCT C (e.g., 57) is lower when compared to other products (e.g., PRODUCT A, PRODUCT B and PRODUCT D), the PRODUCT C is placed farther from laptop 340. Similarly, the PRODUCT A (e.g., 58) and the PRODUCT B (e.g., 93) are placed in the third portion 335. In one exemplary embodiment, when the search criteria are modified, the placement of the particles (e.g., products) may change accordingly.

In one exemplary embodiment, top scored products may be presented at a first change in response to a motion of a mobile device. For example, when the first change in motion of the mobile device is received, the PRODUCT D and PRODUCT B may be presented. Further, upon receiving second change in motion of the mobile device, the other products such as PRODUCT A and PRODUCT C may be presented. In one exemplary embodiment, when the customer scrolls over the displayed products, the details of the product such as but not limited to a price of the product, location at which the product is placed in the retail store, manufacturing date and expiry date may be displayed. Therefore, the activity of searching products in the retail environment becomes easier as the products are displayed based on the search criteria and various factors associated with the products. Further, employing experts for educating the customers about the products and the product details may not be necessary.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
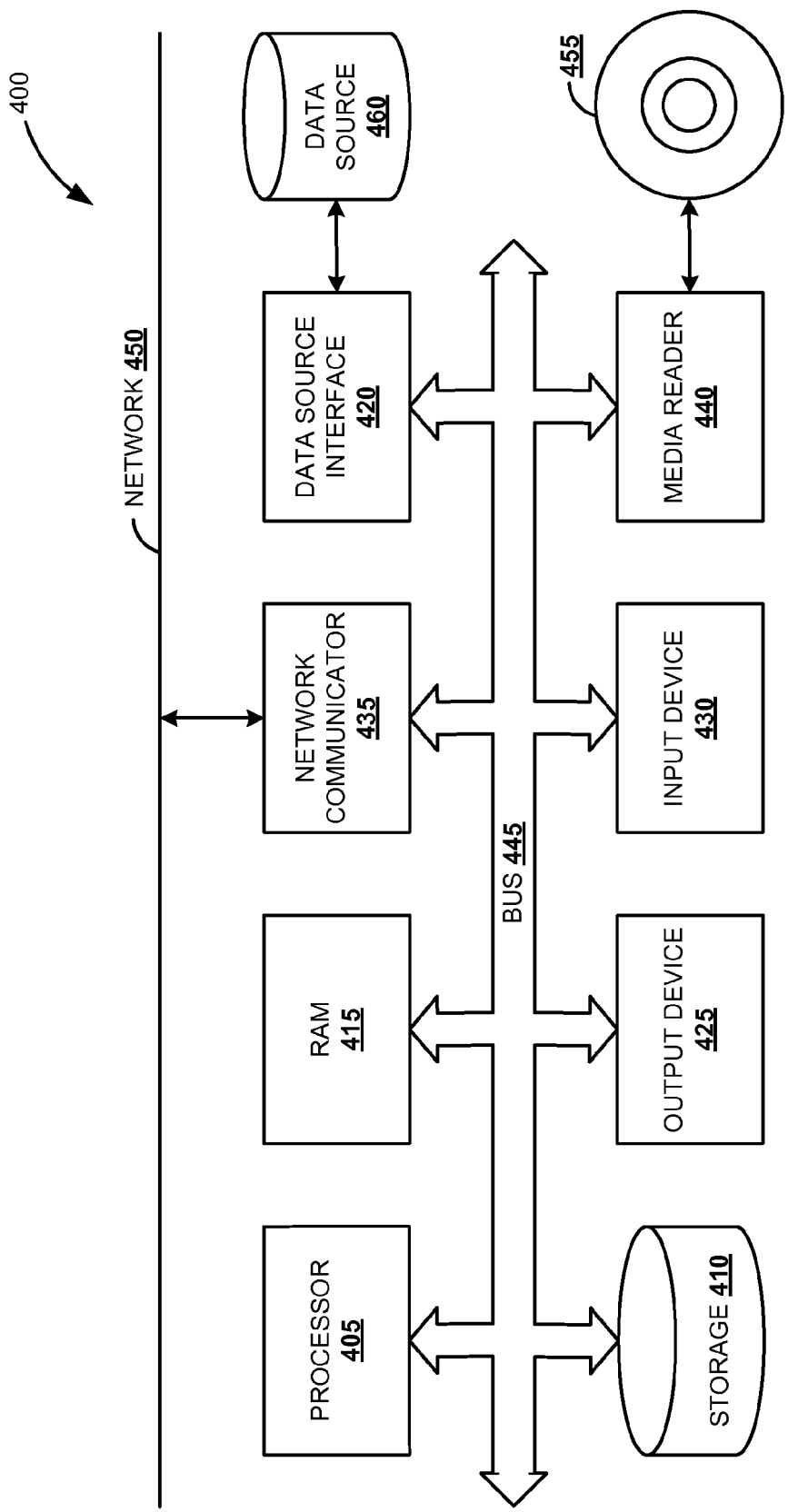
FIG. 4 is a block diagram of an exemplary computer system, according to an embodiment.

FIG. 4 is a block diagram of an exemplary computer system 400, according to an embodiment. The computer system 400 includes a processor 405 that executes software instructions or code stored on a computer readable storage medium 455 to perform the above-illustrated methods. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a tangible computer readable storage medium to physically store instructions, which when executed by a computer, cause the computer to perform operations comprising:
   receive, from a mobile device, one or more search criteria;
   extract products corresponding to the one or more search criteria;
   retrieve values corresponding to a plurality of factors associated with each of the extracted products;
   assign a weightage for each of the retrieved values;
   determine a product score for each of the extracted products, wherein the product score of a product is determined by summing multiplications between the retrieved values associated with the product and the assigned weightages; and
   arrange the products based on the determined product score of each product to assist product searching.

2. The article of manufacture of claim 1, wherein the products are extracted from an in-memory computing database.

3. The article of manufacture of claim 1, wherein the plurality of factors comprises at least one of a price discount, a rating and an energy star associated with each product.

4. The article of manufacture of claim 3, wherein the rating associated with each product is retrieved from reviews associated with each product using a natural language processing (NLP) technique.

5. The article of manufacture of claim 1, wherein the products are arranged on a display of the mobile device using a dust and magnet information visualization technique.

6. The article of manufacture of claim 1, wherein receiving the one or more search criteria further comprises receiving a change in motion of the mobile device.

7. The article of manufacture of claim 1, wherein arranging the products comprises:
   arranging top scored products at a first change in motion of the mobile device; and
   arranging other products at a second change in motion of the mobile device.

8. A computer implemented method to assist product searching in a retail environment, the method comprising:
   receiving, from a mobile device, one or more search criteria;
   extracting products corresponding to the one or more search criteria;
   retrieving values corresponding to a plurality of factors associated with each of the extracted products;
   assigning a weightage for each of the retrieved values;
   determining a product score for each of the extracted products, wherein the product score of a product is determined by summing multiplications between the retrieved values associated with the product and the assigned weightages; and
   arranging the products based on the determined product score of each product to assist product searching.

9. The computer implemented method of claim 8, wherein the products are extracted from an in-memory computing database.

10. The computer implemented method of claim 8, wherein the plurality of factors comprises at least one of a price discount, a rating and an energy star associated with each product.

11. The computer implemented method of claim 10, wherein the rating associated with each product is retrieved from reviews associated with each product using a natural language processing (NLP) technique.

12. The computer implemented method of claim 8, wherein the products are arranged on a display of the mobile device using a dust and magnet information visualization technique.

13. The computer implemented method of claim 8, wherein receiving the one or more search criteria further comprises receiving a change in motion of the mobile device.

14. The computer implemented method of claim 8, wherein arranging the products comprises:
   arranging top scored products at a first change in motion of the mobile device; and
   arranging other products at a second change in motion of the mobile device.

15. A computer system to assist product searching in a retail environment, the computer system comprising a processor, the processor communicating with memory devices storing instructions to:
   receive, from a mobile device, one or more search criteria;
   extract products corresponding to the one or more search criteria;
   retrieve values corresponding to a plurality of factors associated with each of the extracted products;
   assign a weightage for each of the retrieved values;
   determine a product score for each of the extracted products, wherein the product score of a product is determined by summing multiplications between the retrieved values associated with the product and the assigned weightages; and
   arrange the products based on the determined product score of each product to assist product searching.

16. The computer system of claim 15, wherein the products are extracted from an in-memory computing database.

17. The computer system of claim 15, wherein the plurality of factors comprises at least one of a price discount, a rating and an energy star associated with each product.

18. The computer system of claim 15, wherein the products are arranged on a display of the mobile device using a dust and magnet information visualization technique.

19. The computer system of claim 15, wherein receiving the one or more search criteria further comprises receiving a change in motion of the mobile device.

20. The computer system of claim 15, wherein arranging the products comprises:

arranging top scored products at a first change in motion of the mobile device; and arranging other products at a second change in motion of the mobile device.

\* \* \* \* \*